(12) United States Patent
Park

(10) Patent No.: US 6,283,463 B1
(45) Date of Patent: Sep. 4, 2001

(54) CONSTRUCTION OF TORSION BAR FOR TILTING CABIN OF AN AUTOMOBILE

(75) Inventor: Sung Shik Park, Jullabuk-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/390,714

(22) Filed: Sep. 7, 1999

(30) Foreign Application Priority Data

Sep. 7, 1998 (KR) .................................................. 98-36676

(51) Int. Cl.[7] ................................. B60G 11/18; F16F 1/14
(52) U.S. Cl. ............................................. 267/273; 267/154
(58) Field of Search ................................. 267/154, 273, 267/277, 278, 285, 284, 283, 282, 281, 280, 279

(56) References Cited

U.S. PATENT DOCUMENTS

| 2,951,548 | * | 9/1960 | Crockett et al. | 267/273 |
| 3,146,847 | * | 9/1964 | Rutman et al. | 267/278 |
| 5,520,376 | * | 5/1996 | Langa et al. | 267/273 |
| 5,687,960 | * | 11/1997 | Moon | 267/273 |
| 5,730,239 | * | 3/1998 | Holter | 180/69.21 |
| 5,799,893 | * | 9/1998 | Miller, III et al. | 280/805 |
| 6,012,667 | * | 1/2000 | Calancy, III et al. | 280/805 |

FOREIGN PATENT DOCUMENTS

| 2329178 | * | 10/1975 | (FR) | 267/154 |
| 2582996 | * | 6/1985 | (FR) | 267/154 |
| 62246636 | * | 10/1997 | (JP) | 267/154 |

* cited by examiner

Primary Examiner—Robert J. Oberleitner
Assistant Examiner—Devon Kramer
(74) Attorney, Agent, or Firm—Birch, Stewart, Kolasch & Birch, LLP

(57) ABSTRACT

The present invention relates to a torsion bar for tilting the cabin of an automobile, particularly related to a torsion bar having a different number of serrations on its ends, which can improve the assembling work of the torsion and the tilting effect of the cabin. When the torsion bar is assembled to the hinge bracket and the torsion bar arm, at least one serration on the ends of the torsion bar are automatically arranged in a straight line and torque is not applied on the torsion bar.

2 Claims, 2 Drawing Sheets

CONSTRUCTION OF TORSION BAR FOR TILTING CABIN OF AN AUTOMOBILE

BACKGROUND OF THE INVENTION

Field of the Invention

The present invention is related to torsion bar for tilting cabin of an automobile, particularly related to torsion bar having different number of serration on its both ends, which can improve the assembling work of the torsion bar and the tilting effect of the cabin. When assembling the torsion bar, at least one serration on both ends of the torsion bar get automatically arranged in straight line and torque is not applied on the torsion bar.

Generally driver's room mounted on automobile such as truck and heavy equipment for guarding the driver is called cabin.

A suspension is mounted under the cabin for absorbing the shock from the ground and improving riding feeling. The suspension is positioned between the axle shaft and the body of the vehicle.

A hinge bracket and a torsion bar arm are mounted on both sides of the suspension. A torsion bar is mounted between the hinge bracket and the torsion bar arm. The torsion bar is fixed on the frame of the cabin.

The torsion bar serves as a pivot shaft of the cabin, when the cabin is tilted forward from the horizontal state for inspecting the engine and the shassis under the cabin of the vehicle. Therefore the torsion bar is closely related to the effect of operation for tilting of the cabin.

The effect of tilting operation is caused by the diameter of the torsion bar and the facility for mounting the torsion bar.

The facility for mounting the torsion bar is that little torque can be applied to the torsion bar, when the male serration on the both ends of the torsion bar is engaged with the female serration or a hinge bracket and a torsion bar arm.

FIG. 1 is a perspective view to show the torsion bar assembled to the frame of the cabin according to the prior art. FIG. 2 is a perspective view to show the prior torsion bar disassembled from the hinge bracket and the torsion bar arm.

Generally, a hinge bracket 112 is assembled to an end of the torsion bar 114 and a torsion bar arm 116 is assembled to the other end of the torsion bar 114. And the torsion bar 114 is horizontally set to the under frame of the cabin. The torsion bar 114 is assembled to the hinge bracket 112 and the torsion bar arm 116 respectively with serration 120 shaped on its both ends.

A grip 118 is provided on the lower end of the cabin 100, which is tilted forward from the body of the vehicle using the grip 118 for inspecting the engine and the shassis under the cabin.

The serration is shaped on the both ends of the torsion bar 114. In the prior torsion bar the number of each serration provided on the both ends are equal. Traditionally the number of serration is adopted one of the 40 EA and 38 HA selectively.

Then according to the above, as the same number of the serration 120 is shaped on the both ends of the torsion bar 114, it is very difficult for each teeth comprising the serration shaped on the both ends of torsion bar to be arranged in straight line, when shaping the serration on the both ends of the torsion bar. If each teeth of the serration on the both ends is not matched to each other, torque is occurred on the torsion bar 114, when the torsion bar is assembled to the hinge bracket 112 and the torsion bar arm 116.

The torque applied on the torsion bar make that the gap between the torsion bar and the under frame of the cabin be reduced. The result of that, it is impossible that the torsion bar is fitted to the under frame of the cabin or much effort is required for tilting the cabin forward.

SUMMARY OF THE INVENTION

The object of the present invention is to provide the construction of torsion bar for tilting cabin of an automobile, which torque may not be applied on the torsion bar, when the torsion bar is assembled to the hinge bracket and the torsion bar arm.

The present invention to achieve the above object is comprising that the number of the serration is different between the one end of the torsion bar and the other end of it each other. Thereby at least one of the teeth comprising the serration shaped on the both end of the torsion bar can be aligned so that the torque is not applied to the torsion bar, when the torsion bar is assembled to the hinge bracket and the torsion bar arm.

The serration shaped on the one end of the torsion bar has forty teeth and the serration shaped on the other end of the torsion bar has thirty-eight teeth.

At least six pairs among the forty teeth and the thirty-eight teeth shaped on the both ends of the torsion bar respectively are matched in straight line within ±0.5° range. Therefore one couple of the matched teeth is selected as a basic line for assembling the torsion bar to the hinge bracket and the torsion bar arm. As the torsion bar is assembled to the hinge bracket and the torsion bar arm along the basic line, torsion may not be occurred on the torsion bar.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE INVENTION

Figure 1:
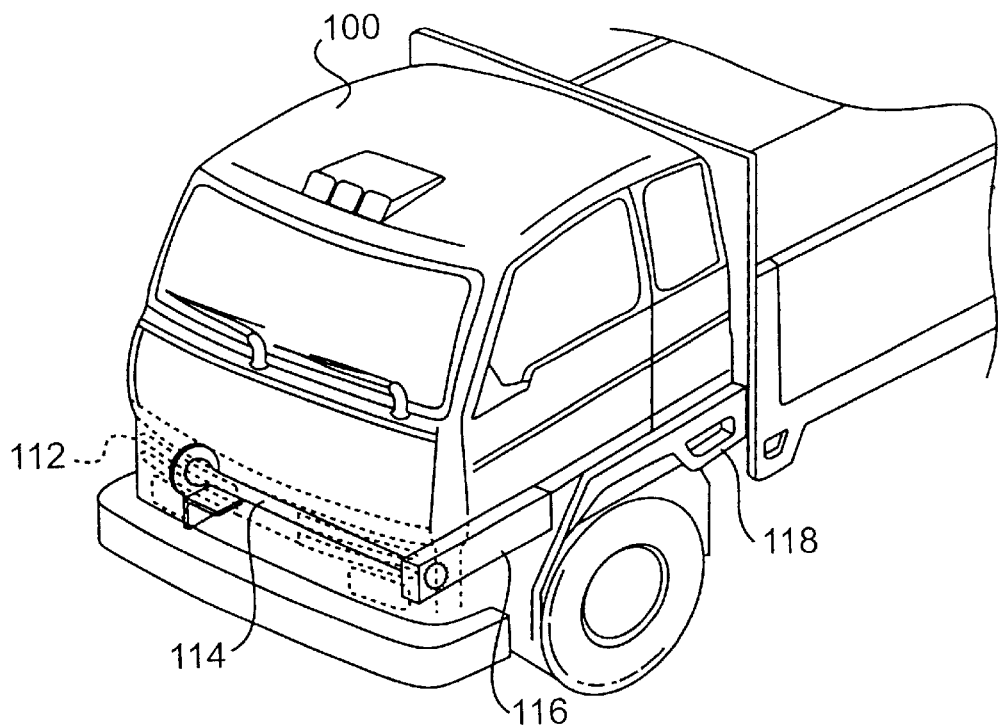
FIG. 1 is a perspective view to show the prior art of the torsion bar mounted under the cabin of an automobile.
Figure 2:
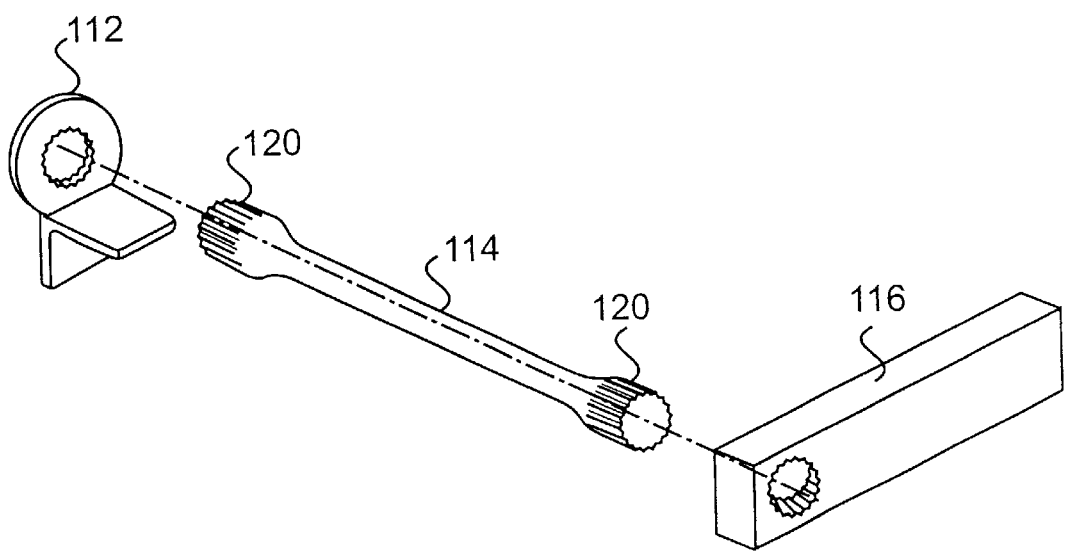
FIG. 2 is a disassembled perspective view of the torsion bar assembly.

The present invention comprises that a torsion bar 16 having different number of male serration 20, 22 on its both ends each other, a hinge bracket 24 having a female serration 25 matched with the serration 20 shaped on one end of the torsion bar 16, and a torsion bar arm 26 having a female serration 27 matched with the serration 22 shaped on the other end of the torsion bar 16.

The number of the teeth comprising the serration 20 shaped on one end of the torsion bar 16 is forty, and the number of the teeth comprising the serration 22 shaped on the other end of the serration 16 is thirty-eight.

As the number of the teeth comprising the each serration 20, 22 is different each other, at least six pairs among the forty teeth and the thirty-eight teeth shaped on the both ends of the torsion bar are matched in straight line within ±0.5° range. The one pair of the matched teeth is selected as a basic line for assembling the torsion bar to the hinge bracket and the torsion bar arm. And then, as the torsion bar is assembled to the hinge bracket and the torsion bar arm along the basic line, torque may not be applied on the torsion bar.

Figure 3:
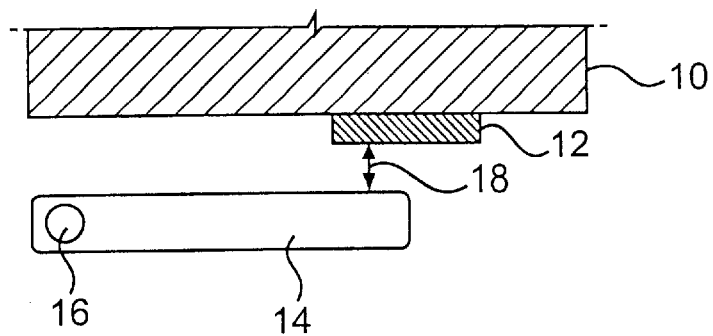
FIG. 3 is a section view of the state that a torsion bar is mounted under the cabin of an automobile.
Figure 4:
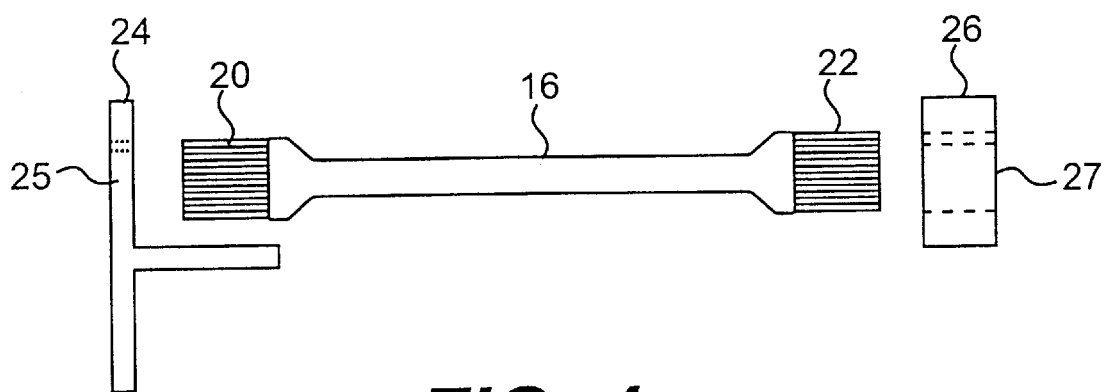
FIG. 4 is a plan view to show the torsion bar in accordance with the present invention.
Figure 5:
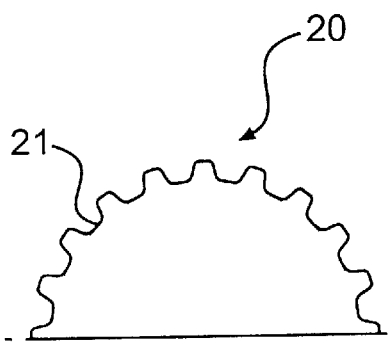
FIG. 5 is a left side view to show the torsion bar in accordance with the present invention.
Figure 6:
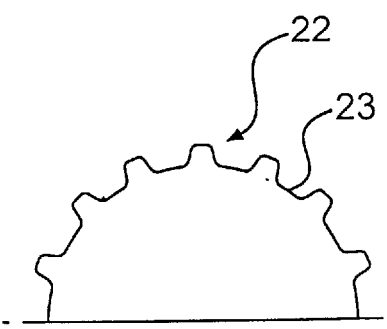
FIG. 6 is a right side view to show the torsion bar in accordance with the present invention.

FIG. 3 is a section view to show the under construction of the cabin. FIG. 4 is a front view of the torsion bar according to the present invention. FIG. 5 is a left side view of the torsion bar according to the present invention. And FIG. 6 is a right side view of the torsion bar according to the present invention.

As showing in FIG. 3, a support 12 is fixed under the cabin 10. A torsion bar arm 14 is mounted under the support 12 with a gap A between them.

A female serration 25 having same number of teeth as that of the one end of the torsion bar 16 is shaped in the hinge bracket 24 and a female serration 27 having same number of teeth as that of the other end of the torsion bar 16.

The number of the teeth comprising the serration 20 shaped on the one end of the torsion bar 16 is 40EA, and the number of the teeth comprising the serration shaped on the other end of the torsion bar 16 is 38EA.

The male serration shaped on both ends of the torsion bar 16 is inserted into of the female serration of the hinge bracket 24 and the torsion bar arm 26 respectively.

The gap a is set to 10 mm in the basic specification. But when cabin 10 in set on the frame of the vehicle, the gap A can be changed between −10 mm and the 30 mm. In case of the gap A being −10 mm, since the torsion bar arm 26 is interfered with the support 12, it is impossible that the torsion bar 16 is mounted under the cabin 10 or excess effort for the tilting of the cabin 10 is supplied from the torsion bar 16. On the other hand, in case the gap A being 30 mm, since the tilting effort is too low, the tilting work is difficult.

To solve the above problem, 10 shims or so are inserted between the torsion bar arm 14 and the support 12, when the cabin 10 is mounted on the frame of the vehicle.

When the 40 teeth and the 38 teeth comprising the serration are respectively shaped on the both ends of the torsion bar 16, the clearance range is adopted within the range of ±0.5°. Therefore, between the 40 teeth and the 38 teeth within ±0.5° are existed 6 the greatest common measure.

The following table is to show an example of the greatest common measure, when 40 teeth and 38 teeth are respectively shaped on both ends of the torsion bar 16.

TABLE 1

| Number of teeth on serration | Degree of the matched portion within ±0.5° of clearance range | | | | | |
|---|---|---|---|---|---|---|
| 40EA | 0° | 9° | 171° | 180° | 189° | 351° |
| 38EA | 0° | 9.4736° | 170.5263° | 180° | 189.4736° | 350.5263° |

As shown the above table 1, six the greatest common measure are existed between the 40 teeth and the 38 teeth within ±0.5°. When the torsion bar 16 is mounted on the cabin 10, one of the 6 G.C.M. is selected as a base portion and marked with paint it.

A line linked with the marked portions 21 and 23 on both ends of the torsion bar 16 makes a straight line. When the torsion bar 16 is assembled, the line made by the marked portion 21 and 23 are considered as base line. Therefore the torsion bar is assembled to the torsion bar arm and the hinge bracket without twist. And the torsion bar can be assembled into the gap A between the torsion bar arm 14 and the support 12 without variation of the gap A.

As described above, since the torsion bar 16 has different number of teeth on its both ends, the torsion bar 16 do not get twisted, when assembled on the hinge bracket and the torsion bar arm. And since the tilting effort is maintained uniformly, it is increased not only the stability but also the reliability of the vehicle. The torsion bar can be easily assembled.

What is claimed is:

1. Construction of a torsion bar for tilting the cabin of an automobile comprising:

a torsion bar having male serrations on its ends, each male serration being comprised of different number of teeth, wherein the teeth comprising the serrations shaped on the ends of the torsion bar have at least six pairs of teeth matched in a straight line within ±0.5° range;

a hinge bracket having female serrations, with which one end of the torsion bar is assembled to the hinge bracket; and a torsion bar arm having female serrations, with which the other end of the torsion bar is assembled to the torsion bar arm.

2. Construction of a torsion bar arm for tilting the cabin of an automobile according to claim 1, wherein the torsion bar is assembled to the hinge bracket and torsion bar arm along the straight line that links the matched teeth of the serrations shaped on the ends thereof.

* * * * *